May 8, 1928.
E. H. PACKER
PISTON RING
Filed March 22, 1927
1,668,779
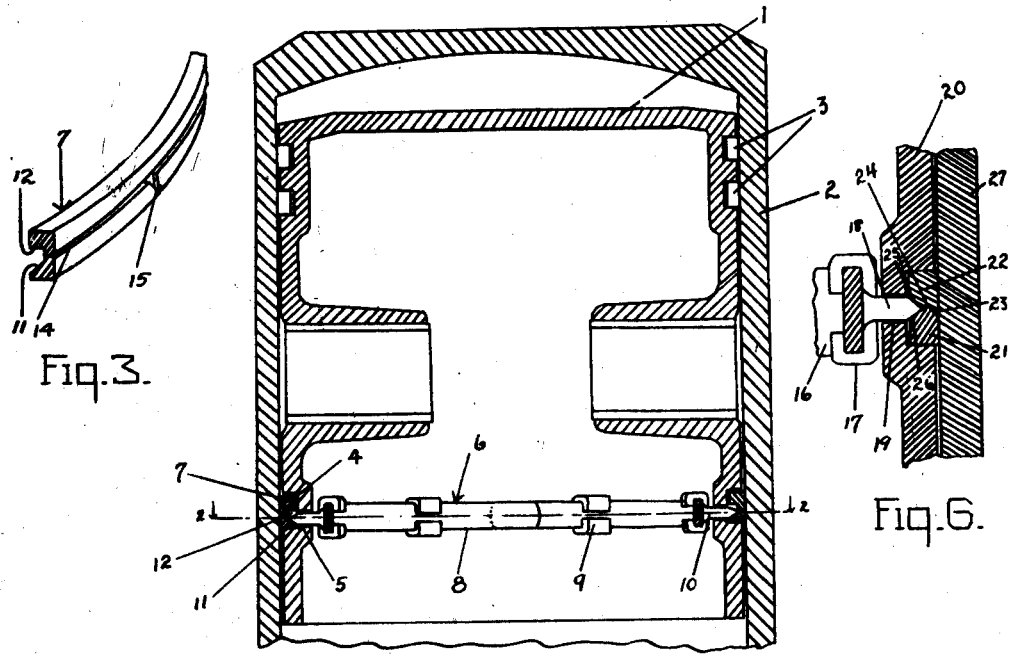
Fig.3.
Fig.1.
Fig.6.
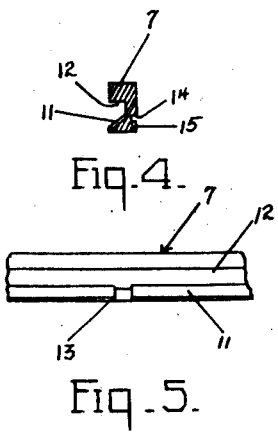
Fig.4.
Fig.5.
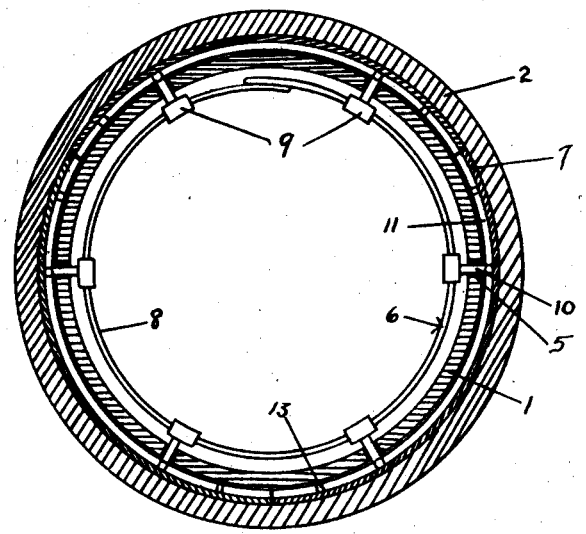
Fig.2.
INVENTOR
E.H.PACKER
BY
ATTORNEY Patented May 8, 1928.

1,668,779

UNITED STATES PATENT OFFICE.

ELDREDGE H. PACKER, OF SAN FRANCISCO, CALIFORNIA.

PISTON RING.

Application filed March 22, 1927. Serial No. 177,246.

This invention relates to improvements in piston rings of the type disclosed in my pending applications for patents filed Feb. 18, 1926, and Nov. 3, 1926, respectively and bear Serial Nos. 86,768 and 145,923. In this type of piston ring there is provided a resilient expanding means contained within the hollow piston, which means includes a series of projections that extend through openings in the wall of the piston into the piston ring groove and engage and push outward and downward on the piston ring. The present invention resides in the provision of an improved means for forcing the piston ring downward against the bottom of the ring groove and outward against the cylinder wall, which means is of simple and inexpensive construction, reliable in operation and capable of long and efficient service.

An object of the present invention is to provide for a simple and easy installation of the device of my invention on a piston, it being only necessary to drill a plurality of holes through the piston wall into one of the piston ring grooves and to provide a beveled face on the piston ring itself in order that the projections which extend through said openings and are yieldingly urged outward by a spring, will engage said beveled face and not only move the piston ring outward laterally but force it downward in tight engagement with the bottom of the ring groove. In my former application Serial No. 145,923, the co-acting beveled faces causing the piston ring to be moved downward were provided on the piston and on the projections, but in the present invention I provide these co-acting beveled faces on the projections and on the piston ring itself, thereby eliminating the necessity of forming openings with beveled faces in the piston.

A further object of the invention is to provide adjustable projections on a split ring to be mounted inside the piston, the relative movement permitted the ring and projections insuring an even application of the spring pressure to the piston ring, there being provided an especial construction to prevent the working of these adjustable projections out of proper position.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a vertical sectional view of the piston showing part of the cylinder therein and showing the ring of my invention as it would appear when installed.

Fig. 2 represents a sectional view taken on the plane line 2—2 of Fig. 1.

Fig. 3 represents a fragmentary perspective view of a part of a piston ring.

Fig. 4 represents a vertical sectional view taken through the piston ring.

Fig. 5 represents a fragmentary inside elevation of the piston ring.

Fig. 6 represents a fragmentary sectional view of a modified form of the invention.

In the embodiment of the invention shown in the accompanying drawing, the hollow piston 1 is mounted in the cylinder 2 in the usual manner, being provided with rings 3 adjacent its upper end and a groove 4 in the lower or skirt portion thereof. To adapt this piston for application of the ring of my invention thereto, a plurality, for example six, holes indicated at 5 are drilled horizontally through the wall of the piston into the ring groove 4 whereby the expanding means of my invention, generally designated 6, may be installed to engage and push outward and downward on the piston ring 7.

The means 6 comprises a resilient split ring 8 formed of flat spring steel, with normally overlapped ends. A plurality of clips 9, for example six, are mounted on this ring so as to be slidable thereon and carry pin-like projections 10 which extend freely through the openings 5 and engage the back of the ring 7. These clips and projections may be constructed in any suitable manner provided that they may be readily slipped onto the ring 8 and will move or slide freely thereon yet hold the projections so that they will transmit the spring force to the piston ring. In practice the holes 5 are made sufficiently large to allow for oil drainage from the piston ring groove around the projections 10 and into the interior of the piston.

The outer ends of the projections 10 are beveled to co-operate with the beveled face 11 provided on the inner side of the piston ring. The piston ring is provided with an annular groove 12 on its inner side and the lower side of this groove is machined to provide the beveled face 11. The pins being urged outwardly by the spring band 8 not only tend to force the ring 12 outward laterally but due to the co-acting beveled face on the ring and projections yieldingly hold the ring closely engaged with the bottom of the piston ring groove. By these arrangements, oil is prevented from working up between the piston ring and cylinder and from working up around the back of the piston ring between the opposed faces of the ring and groove.

To prevent the slidably mounted projections from working out of place and engaging with the piston ring at the joint, the projections which are mounted on opposite sides of the joint of the piston ring engage in depressions 13 formed on the beveled face 11. By allowing the projections to move relative to the spring or vice versa, the expanding force of the spring is applied evenly throughout the piston ring and the proper forcing of the ring outward and downward is insured. By making the beveled face on the inner side of the piston ring instead of beveling the piston openings through which the projections extend, the provision for the downward forcing of the piston ring is made in a more economical and better manner, it being easier to provide the bevel face on the piston ring than in the piston openings. The piston ring may be provided circumferentially with an oil groove 14 on its outer face and with downwardly directed ducts or channels 15 permitting the oil to readily pass into and be retained in said grooves.

The modification of the invention shown in Fig. 6, is the same as in the other form of the invention except as to the piston ring. There is provided the same type of split resilient ring or band 16 having clips 17 slidable thereon and pins 18 carried by the clips. The pins extend through openings 19 in the wall of the piston 20 and engage a sectional piston ring made up of a lower section 21 and an upper section 22. The ring section 21 is provided on its upper side with a convex portion 23 engaging in a V-shaped annular groove 24 provided in the lower side of the section 22. On the lower side of the section 22 is a beveled face 25 corresponding to the beveled face 26 on the upper side of the section 21. The pin is beveled or pointed so as to simultaneously engage both beveled faces. This transmits the spring action to the ring so that the upper section is forced upwardly and the lower section downwardly while both sections are forced out into engagement with the cylinder 27. This causes the piston ring to seat firmly against the upper and lower sides of the piston ring groove, said ring being yieldingly held in such seating engagement with the groove. The advantages of this construction are a tight fitting ring which will be yieldingly maintained at all times in a position to prevent leakage of oil up past it and to insure holding the compression in the cylinder.

I claim:

1. The combination with a cylinder and a piston operating in the cylinder, which piston is provided with a piston ring groove and with openings extending through the piston at the back of the groove, of a split resilient ring mounted interiorly of the piston, a piston ring mounted in the groove and having a beveled face therein, and projections carried by the split resilient ring extending through the openings in said piston and engaging said beveled face of the piston ring.

2. The combination with a cylinder and a piston operating in the cylinder, which piston is provided with a piston ring groove and with openings extending through the piston at the back of the groove, of a split resilient ring mounted interiorly of the piston, a piston ring mounted in the groove and having a beveled face therein and projections carried by the split resilient ring extending through the openings in said piston and engaging said beveled face of the piston ring, said ring having depressions in the beveled face thereof in which certain of said projections engage.

3. The combination with a cylinder and a piston therein, which piston is provided with a piston ring groove and with openings extending through the piston at the back of the groove, of a resilient ring mounted interiorly of the piston, a piston ring mounted within the groove and having a beveled face therein and projections adjustably mounted upon the resilient ring extending through the openings and engaging the beveled face of the piston ring.

4. The combination with a cylinder and a piston operating therein, which piston is provided with a piston ring groove, a two part piston ring mounted within the groove and comprising two annular sections one mounted on the other, an expanding resilient ring mounted within the piston, said piston having openings extending through the back of the piston ring groove, said piston ring sections having beveled faces and projections carried by the expanding ring within the piston extending through said openings and engaging the beveled faces of the ring sections.

ELDREDGE H. PACKER.